(12) United States Patent
Edgar

(10) Patent No.: US 6,491,403 B2
(45) Date of Patent: *Dec. 10, 2002

(54) REAR-FACING CHILD SEAT MIRROR DEVICE

(76) Inventor: Derek A. Edgar, 1527 Curdes Ave., Fort Wayne, IN (US) 46805

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/566,753

(22) Filed: May 9, 2000

(65) Prior Publication Data

US 2002/0036846 A1 Mar. 28, 2002

(51) Int. Cl.$^7$ ............................................... G02B 7/182
(52) U.S. Cl. ....................... 359/872; 359/881; 297/185
(58) Field of Search ................................. 359/844, 857, 359/860, 862, 863, 865, 871, 872, 881; 297/185

(56) References Cited

U.S. PATENT DOCUMENTS

| | | | |
|---|---|---|---|
| 4,687,305 A | * 8/1987 | Harris, Jr. et al. | 359/863 |
| 4,702,572 A | 10/1987 | Cossey | 359/881 |
| 4,712,892 A | * 12/1987 | Masucci | 359/871 |
| 4,902,118 A | 2/1990 | Harris | 359/871 |
| 5,285,321 A | 2/1994 | Nolan-Brown | 359/857 |
| 5,453,882 A | 9/1995 | Westman | 359/855 |
| 5,576,898 A | 11/1996 | Rubin | 359/841 |
| 5,668,526 A | 9/1997 | Collins | 340/326 |
| 6,039,455 A | * 3/2000 | Sorenson | 362/142 |
| 6,120,155 A | * 9/2000 | Brennan et al. | 359/857 |
| 6,367,875 B1 | * 4/2002 | Bapst | 297/130 |

\* cited by examiner

Primary Examiner—Mark A. Robinson
(74) Attorney, Agent, or Firm—Baker & Daniels

(57) ABSTRACT

An assembly for observing an infant in a rear facing child safety seat located on a rear seat of a motor vehicle which includes a mirror and a mirror support arm. The mirror support arm includes a base or lower portion that is configured to be coupled to a child seat or otherwise held in position thereby. An upper portion of the mirror support arm includes a portion that is configured to secure the mirror thereto in an adjustable manner, so that the mirror can be aligned to provide a person sitting in a front seat of the motor vehicle with a line of sight to the infant which line of sight that is directed off the mirror and a rear view mirror that is provided in the front portion of the motor vehicle.

21 Claims, 2 Drawing Sheets

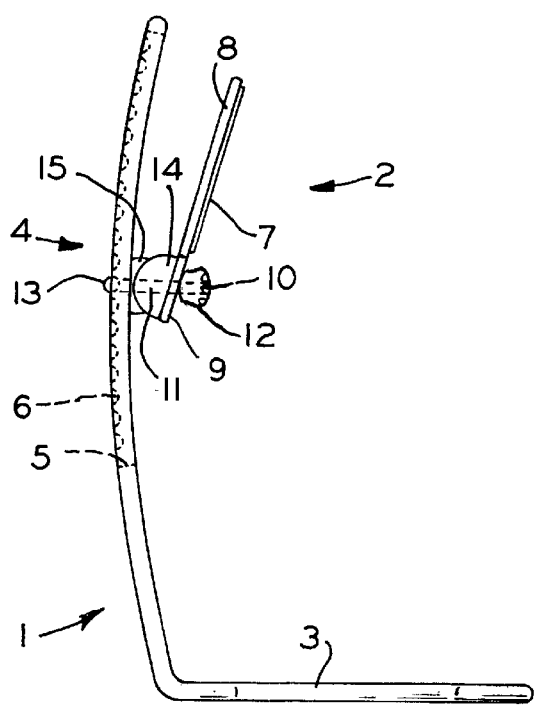
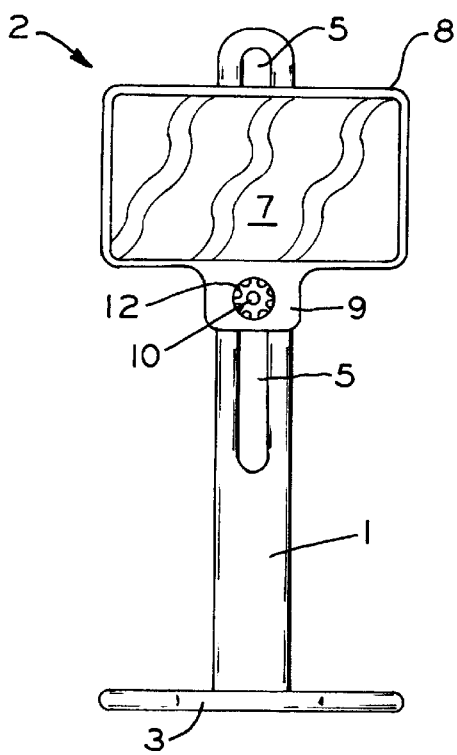
FIG_1
FIG_2
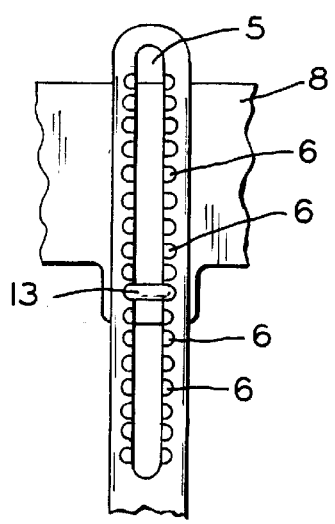
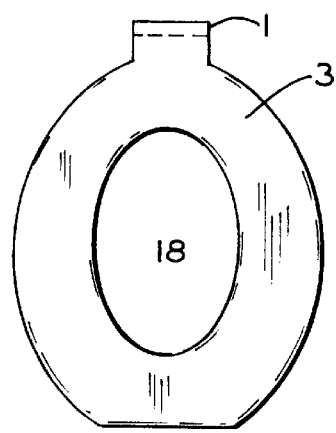
FIG_3
FIG_4

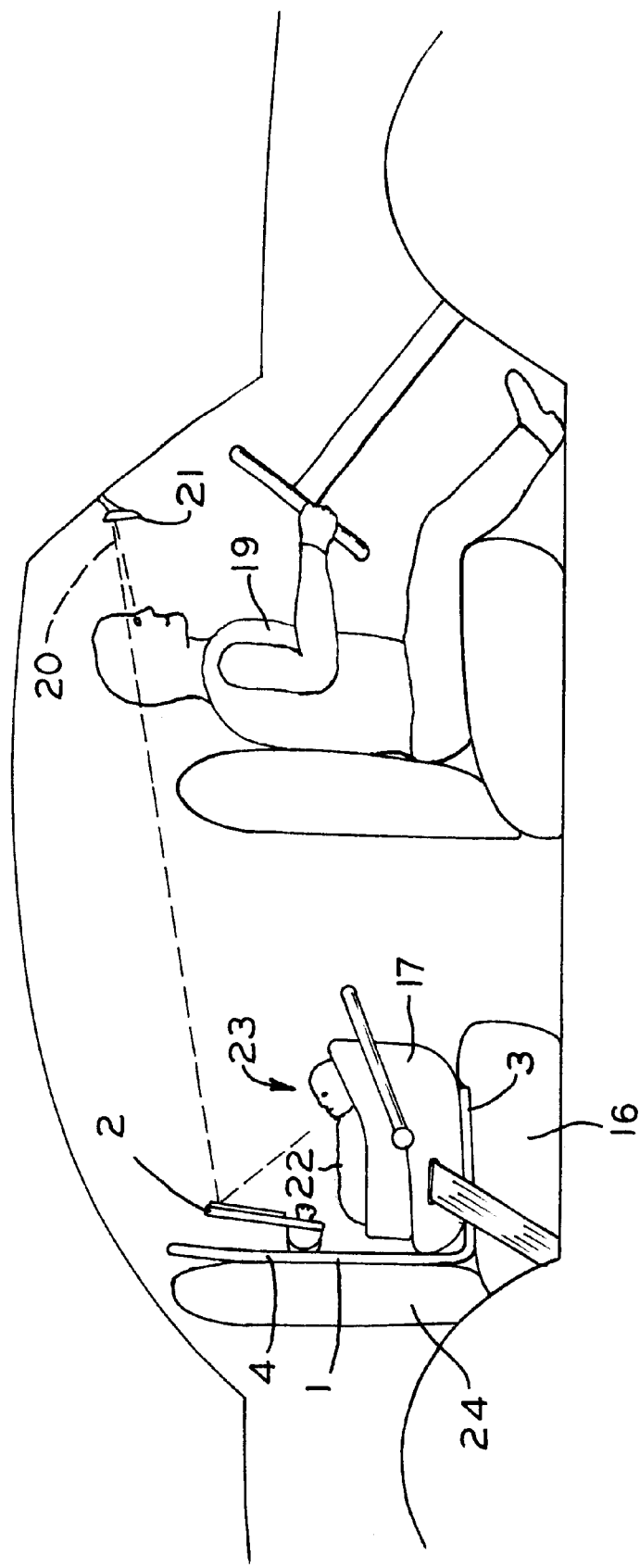
FIG_5

REAR-FACING CHILD SEAT MIRROR DEVICE

TECHNICAL FIELD

The present invention relates to child safety devices. More particularly, the present invention relates to a visual monitoring assembly which allows a driver of a vehicle to observe a child sitting in a rear-facing child seat positioned in the rear passenger compartment of a vehicle.

BACKGROUND ART

Following the advent of the use of air bags in motor vehicles, it has been determined that it is much safer to seat children in the rear passenger compartments of motor vehicles equipped with air bags. In addition, it has been determined that rear-facing child seats are safer than front-facing seats, because the raised back portions of rear-facing seats function to catch and prevent children from being propelled out of the seats in the event of an abrupt deceleration of a motor vehicle.

The Child Passenger Protection Act which became law in 1983, requires that an infant traveling in a motor vehicle be secured in a safety seat that is itself fastened to the center of the rear seat of the vehicle by means of seat belts. As a result of the Child Passenger Protection Act and other safety concerns, it has become common practice to locate child seats in the rear of motor vehicles and position the seats such that infants seated therein face rearwardly.

When a child is positioned in a rear-facing child seat in the rear passenger compartment of a motor vehicle, it is impossible for the driver of such a vehicle to observe the child's face. Thus, a safety concern arises, because the driver may not be able to determine whether the child is troubled, distressed or in any danger. If the infant is crying or otherwise giving indications of distress, the driver, if alone, is put in the position of having to stop the vehicle and perhaps get out of the vehicle to attend to the child.

Even if the infant is quiet, it is important for the driver to be able to visually verify that the infant alright from time to time.

A number of solutions have been proposed for providing drivers of motor vehicles with visual observation of children's faces. Examples of such solutions are exemplified by U.S. Pat. No. 5,668,526 to Collins, U.S. Pat. No. 5,576,898 to Rubin, U.S. Pat. No. 5,453,882 to Westman, U.S. Pat. No. 5,285,321 to Nolan-Brown, U.S. Pat. No. 4,902,118 to Harris and U.S. Pat. No. 4,702,572 to Cossey.

The present invention provides a visual monitoring assembly that allows a driver of a vehicle to observe a child sitting in a rear-facing child seat in the rear passenger compartment of a vehicle, which device is easy to install and use and can be easily transferred for use in different vehicles and with different child safety seats.

DISCLOSURE OF THE INVENTION

According to other features, characteristics, embodiments and alternatives of the present invention which will become apparent as the description thereof proceeds below, the present invention provides a visual monitoring assembly disposed in a vehicle to enable an observer in a front portion of the vehicle to visually observe an infant located in a child safety seat that is positioned on a rear seat of the vehicle, the visual monitoring assembly includes:

a mirror support arm having an upper portion for supporting a mirror and a lower portion that is configured to be held in position by contact with a lower portion of the child safety seat; and a mirror that is supported by the upper portion of the mirror support arm, the mirror support arm and the mirror being positionable so as to provide a line of sight from the observer to the infant which line of sight is directed off the mirror and a rear view mirror that is provided in the front portion of the vehicle.

The present invention further provides an assembly for observing an infant in a rear facing child safety seat located in a rear seat of a motor vehicle having a rear view mirror, which assembly includes:

a substantially L-shaped support arm having an upper portion that extends from a base that is sized to be held in position on a rear seat of the motor vehicle securing the child safety seat thereon; and a mirror that is supported by the upper portion of the support arm, the support arm and the mirror being positionable so as to provide a line of sight that is directed off the rear view mirror and the mirror supported by the upper portion of the support arm.

The present invention also provides a method of observing an infant in a rear facing child safety seat located in a rear seat of a motor vehicle having a rear view mirror, which method involves:

providing a support arm having an upper portion and a lower portion;

holding the support arm in a location in the rear seat of the motor vehicle by contact with a lower portion of the child safety seat;

supporting a mirror on the upper portion of the support arm;

positioning the mirror so as to provide a line of sight that is directed off the rear view mirror and the mirror supported by the upper portion of the support arm; and looking into the rear view mirror and along the line of sight to observe the infant.

BRIEF DESCRIPTION OF DRAWINGS

The present invention will be described hereafter with reference to the attached drawings which are given as non-limiting examples only, in which:

FIG. 1 is a side view of a visual monitoring assembly according to one embodiment of the present invention.

FIG. 2 is a front view of the visual monitoring assembly of claim 1.

FIG. 3 is a rear detailed view of an upper portion of a mirror support arm according to one embodiment of the present invention.

FIG. 4 is a bottom view of a mirror support arm assembly according to one embodiment of the present invention which depicts the base of the mirror support arm.

FIG. 5 is a diagrammatic side view of a vehicle incorporating a visual monitoring assembly according to the present invention.

BEST MODE FOR CARRYING OUT THE INVENTION

The visual monitoring assembly of the present invention includes a mirror and a mirror support arm. The mirror support arm includes a base portion that is configured to be coupled to a child seat or otherwise held in position thereby.

An upper portion of the mirror support arm includes a portion that is configured to secure the mirror thereto in an adjustable manner.

According to one embodiment, the base of the visual monitoring assembly is designed to be positioned between an upper surface of a motor vehicle seat and a child safety seat secured thereto by seat belts. With the base secured in such a manner, the mirror support arm extends upward adjacent the backrest of the seat at a sufficient height so that the mirror can be coupled there to and provide a line of sight that is directed toward an infant sitting in the child safety seat. The mirror is position and aligned so that the driver of the motor vehicle is able to look into a front rear view mirror and observe the infant's face in the mirror attached to the mirror support arm.

FIG. 1 is a side view of a visual monitoring assembly according to one embodiment of the present invention. The visual monitoring assembly includes a mirror support arm 1 to which a mirror 2 is adjustably secured. The mirror support arm 1 includes a base portion 3 from which an elongate arm portion extends. As depicted, the elongate arm portion of the mirror support arm 1 can have a curved shape and can extend at an angle from the base portion so as to conform to the shape of a rear seat of a motor vehicle as will be understood as the description of the invention proceeds.

An upper portion 4 of the support arm 1 is configured to secure the mirror 2 thereto in an adjustable manner. In the embodiment of the invention depicted in FIG. 1, the upper portion 4 of the support arm 1 includes a central slot 5 that extends there through and a plurality of grooves 6 formed in the back surface thereof which intersect the central slot 5 (see also FIG. 3).

FIG. 2 is a front view of the visual monitoring assembly of claim 1.

The mirror 2 includes a mirror element 7 and a mirror support 8. The mirror support 8 includes a coupling area 9 where a threaded end 10 of coupling element 11 can extend for attaching a tightening knob 12 thereto.

As shown in FIG. 1, the coupling element 11 is T-shaped with an end pin 13 that is perpendicular to and opposite end of the threaded portion 10. As also shown in FIG. 1, the back surface of the coupling area 9 includes a convex or spherical portion 14 that can include a vertical slot (not shown) that is wide enough to allow the coupling element 11 to slide therein and thus allow the mirror support 8 to pivot as indicated by double headed arrow "a." An optional bushing or sleeve 15 can also be included as depicted.

FIG. 3 is a rear detailed view of an upper portion of a mirror support arm according to one embodiment of the present invention. As can be understood from FIGS. 1–3, the end pin 13 of the coupling element 11 is received in one of the grooves 6 and is pivotable therein, thereby allowing the mirror 2 to be pivoted in the direction indicated by double headed arrow "a" when the tightening knob 12 is loose. Once the mirror 2 is in a desired position, the tightening knob 12 can be tightened to secure the mirror 2 in the desired position. The height at which the mirror 2 is positioned along the mirror support arm 1 is adjusted by loosening tightening knob 12 and sliding the coupling element 11 along slot 5 until the pin 13 of the coupling element 11 is positioned in a different one of the plurality of grooves 6.

The use of a pin structure on the end of coupling element 11 allows for the mirror 12 to pivot about the axis of the grooves 6 or axis of pin 13. According to an alternative embodiment, the end of the coupling element 11 could be provided with a spherical projection and the grooves 6 could be replaced with semi-spherical depressions in order to provide a configuration which would allow the mirror 2 to swivel when the tightening knob 12 is loose.

The mirror element 7 can be a mirrored glass or mirrored plastic element or a reflective foil element or a reflective foil laminated structure or equivalent thereof. The mirror support 8 can be a frame which surrounds the mirror element 7 or a planar structure to which the mirror element 7 is fastened. The mirror 2 can be rectangular, square, circular, or have any desired shape. The mirror element 7 can be planar or concave.

FIG. 4 is a bottom view of a mirror support arm according to one embodiment of the present invention which depicts the base of the mirror support arm. The base 3 of the mirror support arm 1 depicted in FIG. 4 is configured to be placed on top of a car seat 16 and beneath a child safety seat 17 (See FIG. 5). In this regard, the base 3, which can be substantially planar, has width and length that present an effective surface area that allows that base 3 to be held in position when a child safety seat 17 is placed thereon as depicted in FIG. 5. Reference is made herein to the "effective surface area" because the surface area does not have to be continuous. For example, FIG. 4 depicts a central opening 18 in the base 3 which allows for weight reduction and lower manufacturing costs. Other continuous and non-continuous base shapes and structures can be used as alternatives to the base 3 depicted in FIG. 4.

FIG. 5 is a diagrammatic side view of a vehicle incorporating a visual monitoring assembly according to the present invention. In use, the mirror support arm 1 is positioned so that the base 3 thereof is on the upper surface of the rear seat 16. Next, the child safety seat 17 is positioned on the rear seat 16 and on top of the base 3 of the visual monitoring assembly. The child safety seat 17 is secured in position by coupling a rear seat belt thereto in a conventional manner.

With the child safety seat 17 secured in position on top of the base 3 of the visual monitoring assembly, the height of the mirror 2 along the upper portion 4 of the mirror support arm 1 can be adjustably selected by loosening tightening knob 12 and positioning pin 13 of coupling element 11 in a selected groove 6 as discussed above. In addition, the pivotal angle of the mirror 2 can be adjustably selected by loosening tightening knob 12 and pivoting pin 13 of coupling element 11 in the selected groove 6. Tightening knob 12 can be tightened to secure mirror 2 in position.

When properly positioned, mirror 2 is aligned so as to provide the driver 19 with a line of sight which, as indicated by broken line 20, extends from the driver's eyes to and off the rear view mirror 21 and to and off mirror 2 of the visual monitoring assembly and therefrom onto the infant 22 and particularly the face 23 of the infant 22.

As mentioned above, the mirror support arm 1 can be contoured, i.e. curved, to lie against the backrest 24 of the rear seat 16. Alternatively, the mirror support arm 1 can be configured to be slightly pressed against the backrest 24 of the rear seat 16. One alternative is to provide a flexible resilient connection between base 3 and the vertical arm portion of the mirror support arm 1. It is also possible to have the vertical arm portion of the mirror support arm 1 be spaced apart from the backrest 24 of the rear seat 16.

Another alternative design is to provide the bottom or base of the child safety sear 16 with a recess, slot, channel or similar structure that is configured to receive a complementary shaped base or lower portion of a visual monitoring assembly therein. A further alternative is to provide the front of the base of the child safety seat 16 with a recess, slot, channel or similar structure that is configured to receive a mirror support arm which does not include a base portion.

The components of the visual monitoring assembly can be made from plastic materials, with the mirror element being made from a mirrored glass or mirrored plastic element or a reflective foil or a reflective foil laminated structure. The coupling element 11 can be designed so that the tightening knob 12 cannot be removed from the coupling element 11, so as to prevent the tightening knob from falling therefrom and possibly being swallowed by an infant.

As can be understood, the visual monitoring assembly of the present invention can be adjusted and transferred for use in many different motor vehicles. Likewise it is possible to use two or more of the visual monitoring assemblies in conjunction with a wide angle rear view mirror or additional or multiple auxiliary rear view mirrors.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as described by the claims which follow.

What is claimed is:

1. A visual monitoring assembly disposed in a vehicle to enable an observer in a front portion of the vehicle to visually observe an infant located in a child safety seat that is positioned on a rear seat if the vehicle, the visual monitoring assembly comprising:
    a mirror support arm having an upper portion for supporting a mirror and a lower portion that is configured to be held in position by contact with a lower portion of the child safety seat, the lower portion of the mirror support arm comprising a base that is configured to be positioned between a bottom of the child safety seat and an upper portion of the rear seat, the entire base being substantially planar and having upper and lower surfaces that are substantially parallel to one another, and the upper portion of the mirror support arm extending upward from the upper a surface of the base;
    a mirror that is supported by the upper portion of the mirror support arm,
    the mirror support arm and the mirror being positionable so as to provide a line of sight from the observer to the infant which line of sight is directed off the mirror and a rear view mirror that is provided in the front portion of the vehicle.

2. A visual monitoring assembly according to claim 1, wherein the rear seat has a backrest and the mirror support arm is contoured to a shape of backrest.

3. A visual monitoring assembly according to claim 1, wherein the mirror is pivotally coupled to the upper portion of the mirror support arm.

4. A visual monitoring assembly according to claim 1, wherein the upper portion of the mirror support arm is configured to support the mirror thereon at different positions.

5. A visual monitoring assembly according to claim 4, wherein the upper portion of the mirror support arm is provided with a slot and the mirror is coupled to the mirror support arm by a coupling element that can slide within the slot.

6. A visual monitoring assembly according to claim 5, further including a threaded knob that can be tightened to secure the coupling element and the mirror in a fixed location on the mirror support arm.

7. A visual monitoring assembly according to claim 5, wherein the coupling element includes a projection on one end thereof and the upper portion of the mirror support arm is further provided with recesses along the slot into which recesses the projection of the coupling element can be received.

8. A visual monitoring assembly according to claim 1, wherein the mirror is selected from the group consisting of mirrored glass element, a mirrored plastic element, a reflective foil element and a reflective foil laminated structure.

9. A visual monitoring assembly according to claim 1, wherein the base of the mirror is configured to have a surface area which is smaller than a surface area of the bottom of the child safety seat.

10. A visual monitoring assembly according to claim 9, wherein the base of the mirror has a discontinuous surface area.

11. An assembly for observing an infant in rear facing child safety seat located in a rear seat of a motor vehicle having a rear view mirror, said assembly comprising:
    a substantially L-shaped support arm having an upper portion that extends from a base that is sized to be held in position on a rear seat of the motor vehicle by securing the child safety seat thereon, the entire base being substantially planar and having upper and lower surfaces that are substantially parallel to one another, and the upper portion of the support arm extending upward from the upper surface of the base; and
    a mirror that is supported by the upper portion of the support arm,
    the support arm and the mirror being positionable so as to provide a line of sight that is directed off the rear view mirror and the mirror supported by the upper portion of the support arm.

12. An assembly for observing an infant in a rear facing child safety seat located in a rear seat of a motor vehicle according to claim 11, wherein the rear seat has a backrest and the support arm is contoured to a shape of backrest.

13. An assembly for observing an infant in a rear facing child safety seat located in a rear seat of a motor vehicle according to claim 11, wherein the mirror is pivotally coupled to the upper portion of the support arm.

14. An assembly for observing an infant in a rear facing child safety seat located in a rear of a motor vehicle according to claim 11, wherein the upper portion of the support arm is provided with a slot and the mirror is coupled to the support arm by a coupling element that can slid within the slot.

15. An assembly for observing an infant in a rear facing child safety seat located in a rear seat of a motor vehicle according to claim 14, wherein the coupling element includes a projection on one end thereof and the upper portion of the support arm is further provided with recesses along the slot into which recesses the projection of the coupling element can be received.

16. An assembly for observing an infant in a rear facing child safety seat located in a rear seat of a motor vehicle according to claim 15, wherein the projection is cylindrically shaped.

17. A method of observing an infant in a rear facing child safety seat located in a rear seat of a motor vehicle having a rear view mirror, said method comprising:
    providing a support arm having an upper portion and a lower portion, the lower portion of the mirror support arm comprising a base that is configured to be positioned between a bottom of the child safety seat and an upper portion of the rear seat, the entire base being substantially planar and having upper and lower surfaces that are substantially parallel to one another, and the upper portion of the mirror support and extending upward from the upper surface of the base;

holding the support arm in a location is the rear seat of the motor vehicle by contact with a lower portion of the child safety seat;

supporting a mirror on the upper portion of the support arm;

positioning the mirror so as to provide a line of sight that is directed off the rear view mirror and the mirror supported by the upper portion of the support arm; and looking into the rear view mirror along the line of sight to observe the infant.

18. A method of observing an infant in a rear facing child safety seat located in a rear seat of a motor vehicle according to claim 17, wherein the step of positioning the mirror comprises positioning a height of the mirror relative to the support arm.

19. A method of observing an infant in a rear facing child safety seat located in a rear seat of a motor vehicle according to claim 17, wherein the step of positioning the mirror comprises adjusting an angle of the mirror relative to the support arm.

20. A method of observing an infant in a rear facing child safety seat located in a rear seat of a motor vehicle according to claim 17, wherein the step of positioning the mirror comprises swiveling the mirror relative to the support arm.

21. A method of observing an infant in a rear facing child safety seat located in a rear seat of a motor vehicle according to claim 17, wherein the lower portion of the support arm includes a base and the support arm is held in the location by securing the child safety seat onto the base thereof.

* * * * *